(12) United States Patent
Wiedenman et al.

(10) Patent No.: US 7,421,545 B1
(45) Date of Patent: Sep. 2, 2008

(54) METHOD AND APPARATUS FOR MULTIPLE SEQUENCE ACCESS TO SINGLE ENTRY QUEUE

(75) Inventors: Gregory B. Wiedenman, Woodbury, MN (US); Nathan A. Eckel, Fridley, MN (US)

(73) Assignee: Unisys Corporation, Blue Bell, PA (US)

( * ) Notice: Subject to any disclaimer, the term of this patent is extended or adjusted under 35 U.S.C. 154(b) by 667 days.

(21) Appl. No.: 10/330,995

(22) Filed: Dec. 27, 2002

(51) Int. Cl.
*G06F 12/00* (2006.01)
*G06F 5/10* (2006.01)

(52) U.S. Cl. ............... 711/154; 711/168; 710/52; 710/112

(58) Field of Classification Search ........... 711/154, 711/168; 710/52, 112
See application file for complete search history.

(56) References Cited

U.S. PATENT DOCUMENTS

| | | | | |
|---|---|---|---|---|
| 5,961,615 A | * | 10/1999 | Zaidi et al. | 710/54 |
| 5,983,327 A | * | 11/1999 | Achilles et al. | 711/150 |
| 6,044,438 A | * | 3/2000 | Olnowich | 711/130 |
| 6,216,200 B1 | * | 4/2001 | Yeager | 711/100 |
| 6,567,556 B1 | * | 5/2003 | Bramley | 382/233 |
| 6,757,679 B1 | * | 6/2004 | Fritz | 707/8 |
| 2001/0042174 A1 | * | 11/2001 | Gupta et al. | 711/127 |
| 2003/0145159 A1 | * | 7/2003 | Adiletta et al. | 711/104 |

OTHER PUBLICATIONS

Hennessy et al., "Computer Architecture A Quantitative Approach," Morgan Hauffmann Publishers, Inc., 1990, pp. 654-662.*

* cited by examiner

*Primary Examiner*—Matt Kim
*Assistant Examiner*—Shane M Thomas
(74) *Attorney, Agent, or Firm*—Charles A. Johnson; Robert Marley; Crawford Maunu PLLC

(57) ABSTRACT

Bus address, function and system information in relation to bus requests are maintained in a centralized location (702). Parallel access to the centralized data is facilitated through the use of pointers to the centralized location. Bus transaction operations needing access to the centralized data are simultaneously connected to the data through the use of the pointer control (610), rather than requiring the data to be sequentially transmitted to the bus transaction operations as required.

13 Claims, 7 Drawing Sheets

METHOD AND APPARATUS FOR MULTIPLE SEQUENCE ACCESS TO SINGLE ENTRY QUEUE

FIELD OF THE INVENTION

The present invention relates in general to queue control, and more particularly, to queue control which allows simultaneous access to any location within the queue for multiple transactions.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance Intel processors using special hardware and middleware components that build on standard interface components to expand the capabilities of the Microsoft Windows server operating systems. The CMP architecture utilizes a Symmetric Multi-Processor (SMP) design, which employs multiple processors supported by high throughput memory, Input/Output (IO) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may consist at least of the following: 1.) to provide scaling of applications beyond what is normally possible when running Microsoft Windows server operating systems on an SMP system; 2.) to improve the performance, reliability and manageability of a multiple application node by consolidating them on a single, multi-partition system; 3.) to establish new levels of RAS for open servers in support of mission critical applications; and 4.) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor monitors the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory. One major difficulty, however, in a multi-processor environment, is overloading the memory bus through the use of bus snooping, which results in a scalability limitation.

Another problem associated with SMP systems results from managing the many requests submitted to the common system bus shared by the multiple processors or their associated bus interface controllers. As the requests traverse their various stages of execution, the data used by the various execution stages was necessarily transferred to the particular data buffer utilized by that particular execution stage causing unnecessary data transfers to take place. The unnecessary data transfer directly correlating to increased time required to complete each request.

A need exists, therefore, to prevent the necessity of data transfer when the request traverses various stages of execution. Avoidance of unnecessary data transfer would result in decreased execution time per request and would decrease the amount of hardware and related software needed to manage such data transfers.

SUMMARY OF THE INVENTION

The present invention is directed to a method and apparatus for centralizing bus request data within a bus request queue and simultaneously providing access to the bus request data to a plurality of bus transaction processes.

In accordance with one embodiment of the invention, a multiple entry queue system is provided. The multiple entry queue comprising a storage unit having a plurality of storage locations, a multiplexer unit having inputs coupled to each of the plurality of storage locations, a controller coupled to the multiplexer to allow simultaneous access to the plurality of storage locations. The access to the plurality of storage locations is controlled through the use of pointers to the storage locations.

In accordance with another embodiment of the invention, a multiprocessing system is provided. The multiprocessing system comprises a plurality of multiprocessors sharing a common system bus with access to a common memory pool and a node controller coupled to each of the plurality of multiprocessors. The node controller comprises a storage unit having a plurality of storage locations to store bus requests from the plurality of multiprocessors, a multiplexer having inputs coupled to each of the plurality of storage locations, and a controller coupled to the multiplexer to allow simultaneous access to the plurality of storage locations, wherein access to the plurality of storage locations is controlled through the use of pointers to the storage locations.

In accordance with another embodiment of the invention, a method of providing multiple access to a single entry in a bus request queue is provided. The method comprising receiving request data into respective single entries of the bus request queue, providing access to the request data for a plurality of bus transactions, and allowing the bus transactions to share the request data from the bus request queue.

The above summary of the present invention is not intended to describe each illustrated embodiment or implementation of the present invention. This is the purpose of the figures and the associated discussion which follows.

DETAILED DESCRIPTION

Figure 1:
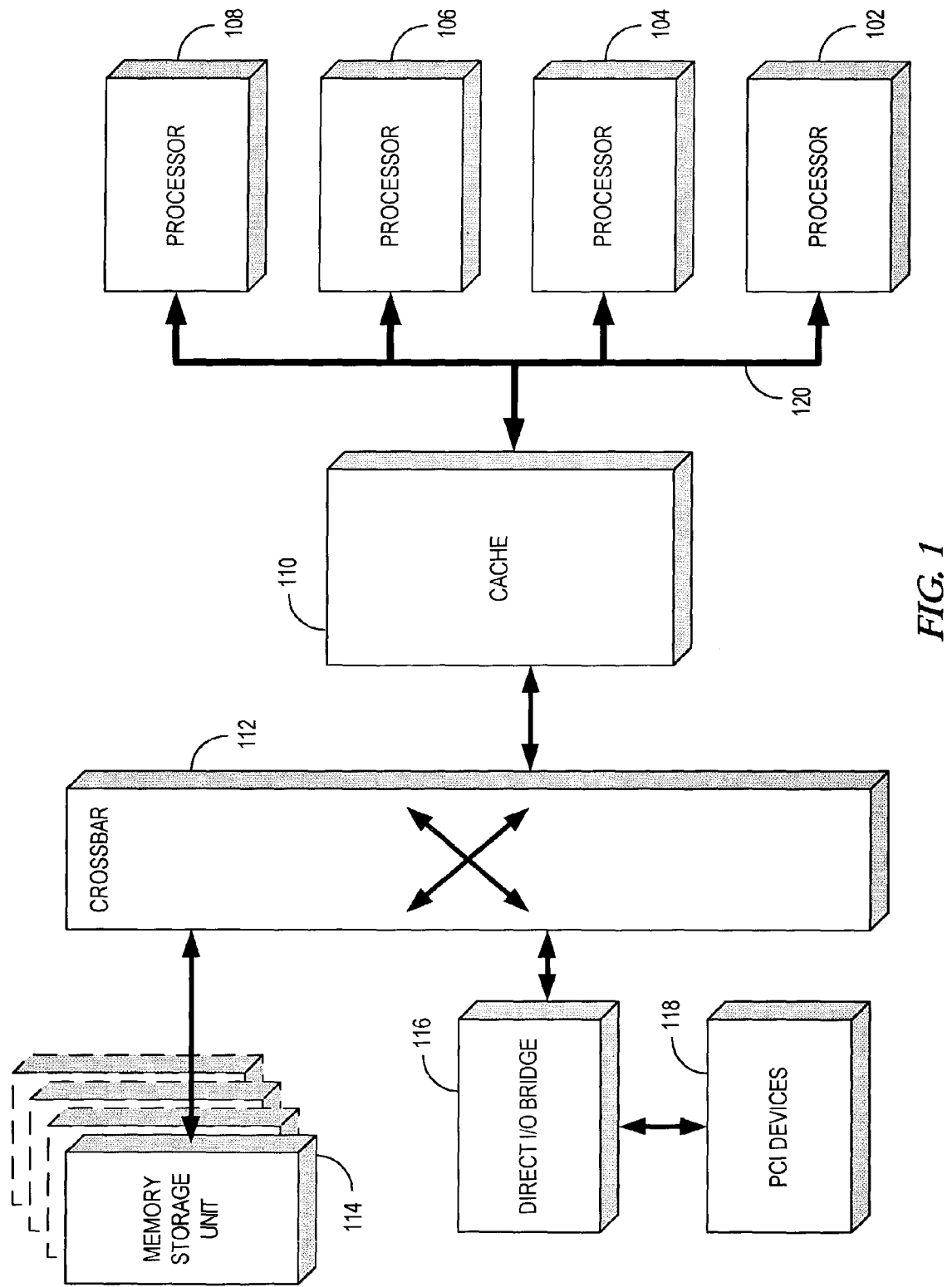
FIG. 1 illustrates a block diagram of a processing cell in accordance with the present invention.

FIG. 1 illustrates an exemplary block diagram of a processing cell in accordance with the present invention. A typical processing cell, or sub-pod, is comprised of multiple Central Processing Units 102-108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102-108 share Cache 110 through bus 120, where bus 120 may serve up to, for example, four processors 102-108. Memory Storage Units 114 provides a shared memory pool for processors 102-108 through non-blocking cross-bar 112. Direct IO Bridge 116 provides high-throughput access to Peripheral Component Interconnect devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory. Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of processors 102-108 and/or cache 110. Crossbar 112 allows for fast, consistently low latency, high bandwidth transmissions between cache 110 and IO bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
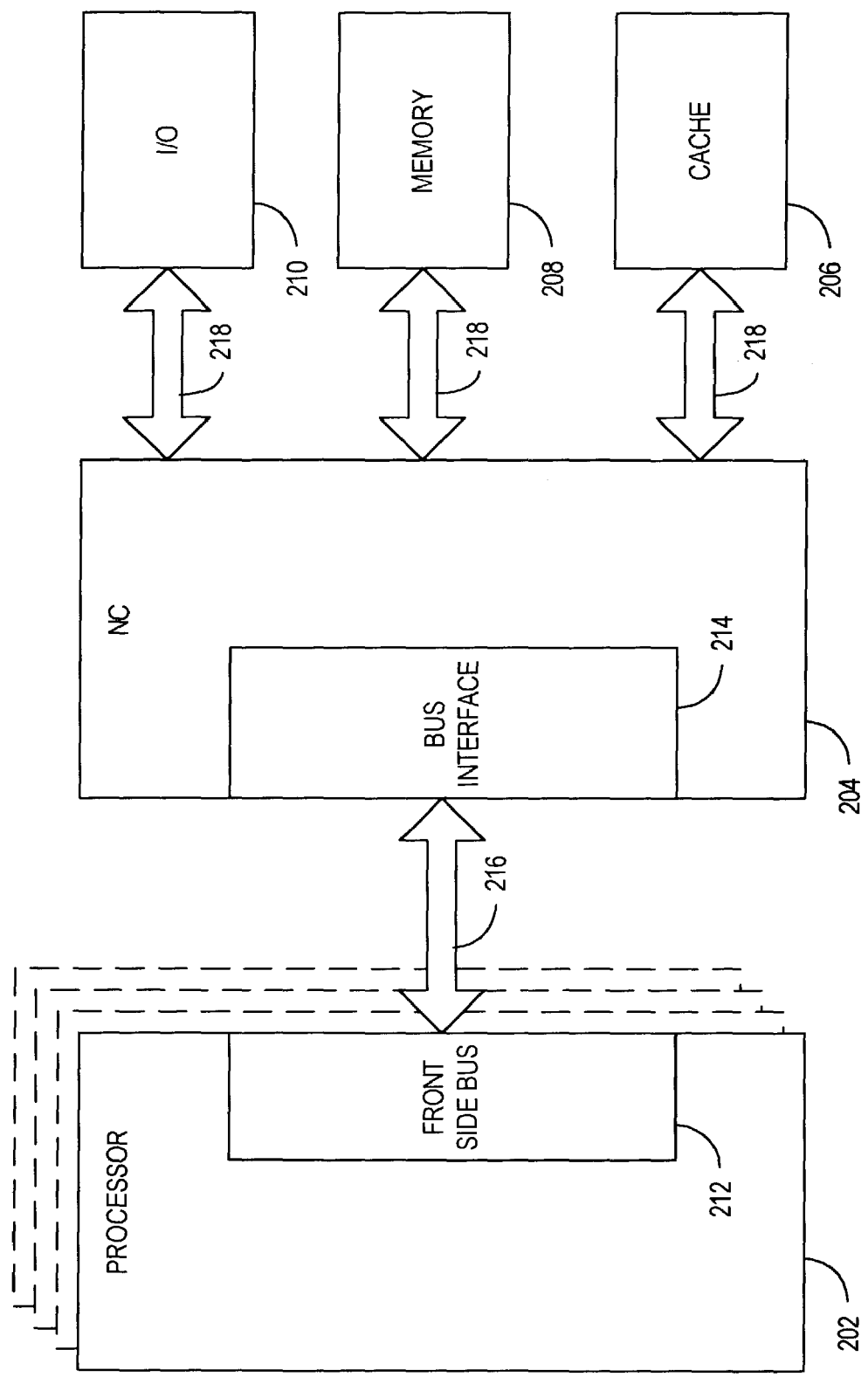
FIG. 2 illustrates a block diagram of the bus interaction of the processing cell of FIG. 1.

FIG. 2 illustrates an exemplary block diagram illustrating bus components within processors 102-108 and the associated bus controller required to negotiate bus access by processors 102-108 to I/O 210, Memory 208, and Cache 206. Processors 202 each contain Front Side Bus (FSB) 212. Node Controller (NC) 204 provides the processor system Bus Interface 214 and cache controller chip for up to four processors 202 operating on common system bus 216. NC 204 resides on the sub-pod module and is the central agent on the processor system bus to allow interactions between processors 202, cache 206, MSU 208, and I/O 210.

NC 204 facilitates access to cache 206 providing quick access to commonly used cache lines that are requested on system bus 216. The data portion of cache 206 resides in Static RAM (SRAM) that is external to NC 204 and a corresponding on-chip tag RAM keeps track of state and control information for the resident cache lines. In operation, copies of frequently accessed state and control information, called cache blocks or cache lines, are maintained in the SRAM portion of cache 206. Each cache block or line is marked with a block address, referred to as a tag, so that cache 206 knows to which part of the SRAM memory space the cache line belongs. The collection of cache tags for each memory block contained within the SRAM is contained within the on-chip tag RAM. For example, if cache line $B_j$ containing data entries $D_j$ is assigned to a portion of SRAM called $M_1$, then $B_j$ is in the on-chip tag RAM and $D_j$ is contained within the SRAM of cache 206. Cache 206 is a non-inclusive cache, meaning that not all cache lines resident in the processor's cache are necessarily resident in cache 206.

In operation, Node Controller 204 decodes Front Side Bus 212 transactions on system bus 216 into two main types: 1.) coherent memory requests; and 2.) non-coherent requests. Coherent memory requests are controlled under the MESI protocol throughout the system and cache 206. Memory within a multiprocessor system in which every memory read and every memory write is instantly known by each processor within the system is known as coherent memory. Coherent memory requests, therefore, must communicate the memory accessed by one processor to the other processors on the bus through the use of a bus snooping function, so that stale data is not used. Coherent memory requests on system bus 216 are monitored by the bus snooping function and communicated to all processors 202 on bus 216. The non-coherent requests, on the other hand, correspond to requests such as memory-mapped I/O, interrupts, and other special transactions which do not use cache 206.

Communication between NC 204, I/O 210, memory 208 and cache 206 is conducted via interface 218, which is implemented using a crossbar similar to the crossbar discussed in relation to FIG. 1. The crossbar is a multi-input, multi-output, non-blocking electronic switch, where access from NC 204 and external components is unimpeded, thus removing any potential bottlenecks. The number of processors 202 operating in conjunction with NC 204 is advantageously limited in order to avoid excessive bus contention on system bus 216, especially in consideration of the bus snooping function as discussed above.

Data transfer on bus 216 may be implemented on varying width buses to include 32, 64 and 128 bit buses and beyond. The clocking rate on bus 216 is usually in the range of several hundred MegaHertz (MHz) and data may be transferred on both the rising and falling edges for double-pumped operation of the system bus clock to achieve an effective system bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 202 are responsible for obeying any bus specification that may exist for bus 216 between Front Side Bus 212 and Bus Interface 214.

Bus Interface 214 interfaces Node Controller 204 to Front Side Bus 212 for each of processors 202. Bus Interface 214 provides at least the following functions: 1.) a request queue that allows NC 204 or processors 202 to generate bus requests; 2.) an in-order queue to receive bus requests from processors 202; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
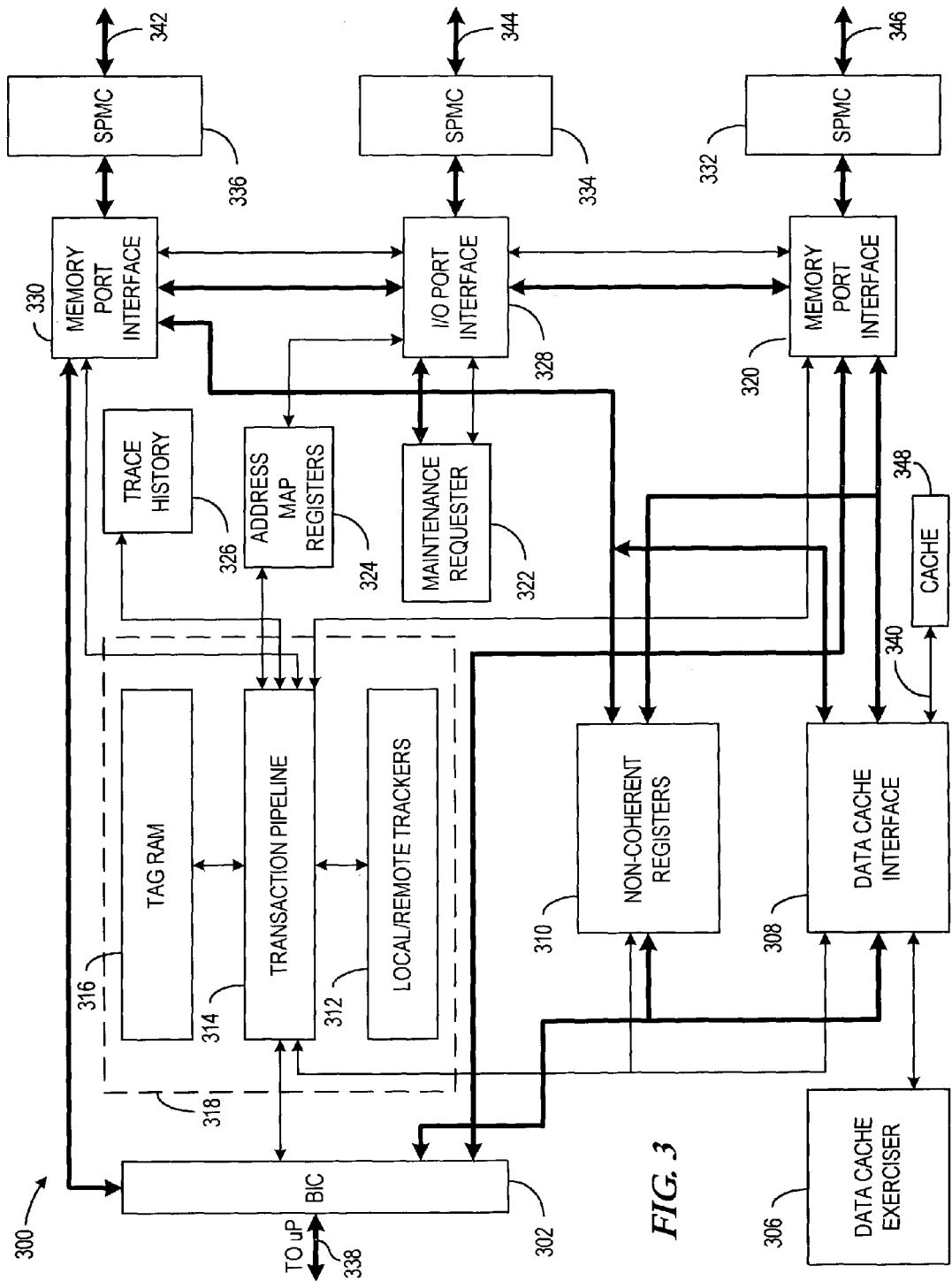
FIG. 3 illustrates a block diagram of a node controller in accordance with the present invention.

FIG. 3 illustrates an exemplary block diagram of Node Controller 300 in accordance with the principles of the present invention and is interconnected as follows. Bus Interface Controller 302 connects to system bus 338, which is the system bus for the processors attached to the particular sub-pod of interest. Bus Interface Controller 302 interconnects through a data bus to Memory Port Interfaces 320 and 330 as well as to Data Cache Interface 308. Transaction Processor 318 is comprised of Tag RAM 316, Transaction Pipeline (TP) 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 302 through a control bus. Transaction Pipeline 314 also provides control through a control bus to Address Map Registers 324, Trace History 326, Memory Port Interfaces 330 and 320. A data bus interconnects Bus Interface Controller 302 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to cache 348 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Memory Controllers 332, 334, and 336 interconnect through a data bus to Memory Port Interface 320, I/O Port Interface 328, and Memory Port Interface 330, respectively. Data buses 342 and 346 interconnect Scalability Port Memory Controllers 336 and 332, respectively, to the respective Memory Storage Unit associated with the particular sub-pod assembly. It should be noted that dual data buses 342 and 346 are provided to Node Controller 204 to allow for fault tolerant functionality, parallel processing, etc. Scalability Port Memory Controllers 344 transfer data between I/O Port Interface 328 and PCI devices 118 as depicted in FIG. 1 and I/O devices 210 as depicted in FIG. 2.

In operation, Node Controller 300 provides all the necessary functions required to facilitate processor bus operations on bus interface 338. In particular, Node Controller 300 facilitates at least seven primary functions: 1.) Out-Going Queue for outgoing requests to be sent out to Bus Interface Controller 302; 2.) In-Order Queue for incoming requests from Bus Interface Controller 302; 3.) Response Control for all bus requests; 4.) Datapath for data transfer and control between Memory Storage Units; 5.) I/O interface module to facilitate access to PCI devices; 6.) History Stack for Bus Interface Controller 302 history capture; and 7.) Error Checking to collect and check all errors. The other major interfaces accommodated by Node Controller 300 include the Bus Interface Controller 302 to Transaction Pipeline 314 interface which handles control signals and address/function signals, data transfers between Bus Interface Controller 302 and Data Cache Interface 308, data transfers between Bus Interface Controller 302 and Memory Storage Unit 0 (not shown) on interface 342, data transfers between Bus Interface Controller 302 and Memory Storage Unit 1 on interface 346 and non-coherent data transfers between Bus Interface Controller 302 and Non-Coherent Registers 310.

The Out-Going Queue function receives requests to be sent to Bus Interface Controller 302 from either Transaction Pipeline 314, Memory Port Interface 330, or Memory Port Interface 320. The requests are individually strobed into a priority selection block which acknowledges and grants execution of the request according to a prioritized selection algorithm, or held for later processing within the Out-Going Request Queue. Each of the requesting entities places information concerning the request type, which may be represented by a 3-5 bit digital code identifying one of a number of possible request types. Likewise, an In-Order Queue is utilized to store requests received from the processor on Bus Interface Controller 302 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on bus interface 338. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. Bus interface 338 may represent, for example, a 32, 64, or 128 bit width and may be enabled for individual bytes within bus 338. For example, if bus interface 338 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on bus 338 may be Error Correction Coded regardless of which bytes are enabled.

Figure 4:
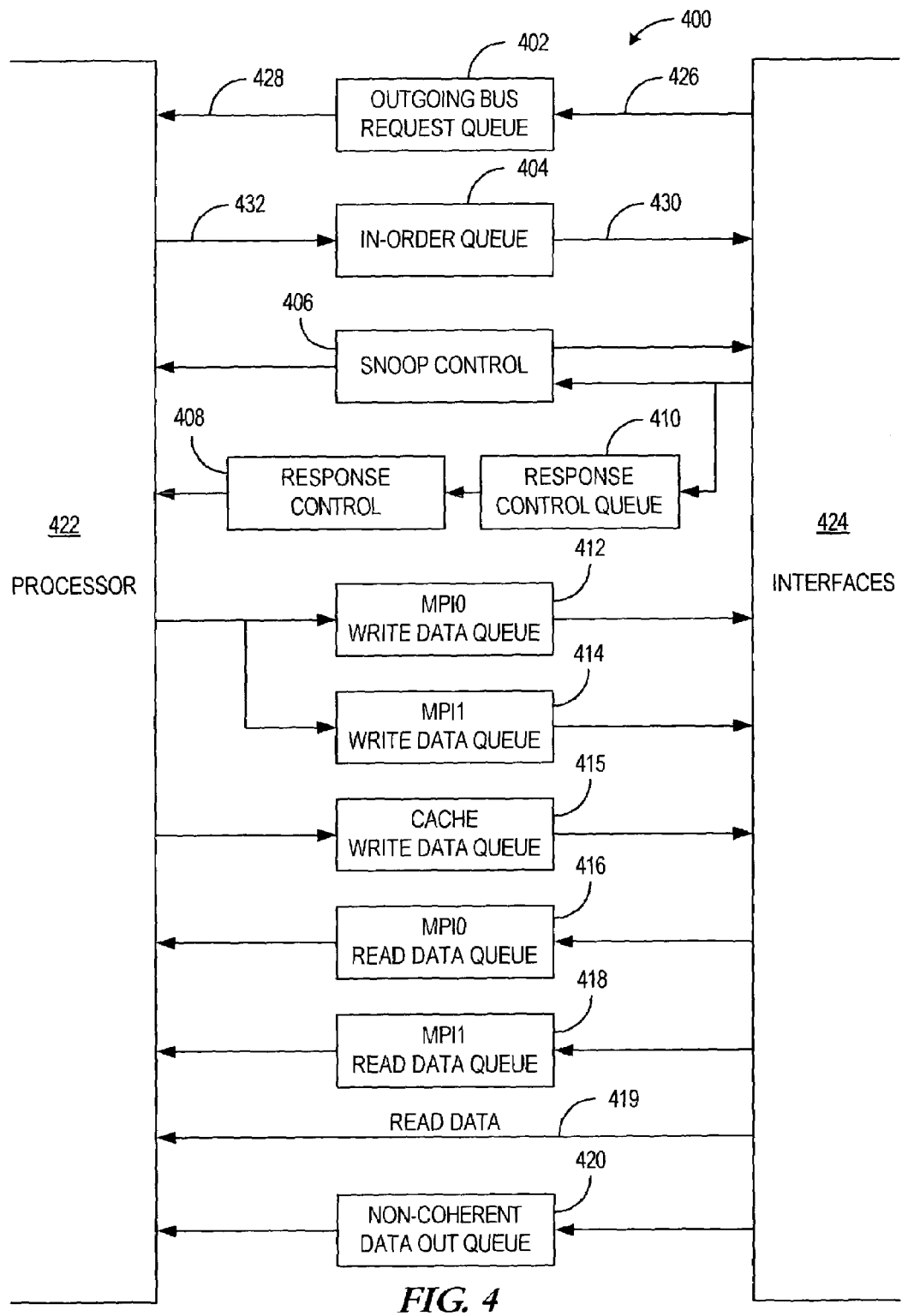
FIG. 4 illustrates a functional block diagram of the bus interface controller of FIG. 3.

FIG. 4 illustrates an exemplary functional block diagram 400 of Bus Interface Controller 302 as illustrated in FIG. 3. Processor 422 may represent one of many processors adapted to contemporaneously interface with other modules/interfaces 424 of the system, such as to the memory interface, cache interface, pipeline, etc. Generally speaking, there exist five phases of operation of Bus Interface Controller 302: 1.) Arbitration; 2.) Request; 3.) Snoop; 4.) Response; and 5.) Data. Arbitration phase operation of Bus Interface Controller 302 allows for one of Processors 422 to obtain control of Bus Interface 338, or alternatively to allow other interfaces 424 to obtain control of Bus Interface 338, during one or more bus clock cycles. Arbitration phase is entered when one of Processors 422 asserts a bus request signal or another interface 424 asserts the bus request signal. A number of agents may simultaneously arbitrate for the request bus, where Processors 422 represent symmetric agents and the other interfaces 424 represent priority agents. Owning the bus is a necessary pre-condition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 302 is entered when either Processors 422 or interface 424 modules have successfully arbitrated for bus control. With reference to both FIGS. 3 and 4, request signals may be provided by Transaction Pipeline 314, Memory Port Interface 330, and Memory Port interface 320 via interfaces 424, and bus request signals may be provided by Processor 422 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from one or more modules/interfaces 424 via interface 426 and provides the requests via Interface 428 to the addressed Processor 422 of the request. Likewise, In-Order Queue 404 receives bus requests from Processor 422 via interface 432 and provides the bus requests to the addressed recipient via bus 430. Each of Outgoing Bus Request Queue and In-Order Queue is limited, for example, to a depth of 8 and are responsible for queuing up requests from interfaces 424 and Processor 422, respectively. Handshake signals are used between Outgoing Bus Request Queue 402 and modules/interfaces 424 and also between In-Order Queue 404 and Processor 422 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline of FIG. 3. Each of Processors 422 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 208. Memory reads are cached into Cache 348 by Data Cache Interface 308, whereby subsequent access to the same memory space results in a memory read from Cache 348 instead of a memory read from Memory 208, resulting in a shorter memory access time. Memory 208, however, represents shared memory space to each Processor 422. Data read from Memory 208 and subsequently cached during one clock cycle from a first Processor 422 may be invalidated by a subsequent write to the same address in Memory 208 by a second Processor 422.

Snoop Control 406 is, therefore, used to provide snoop control of Cache 348 to Processors 422, while In-Order Queue 404 receives snoop requests from Processors 422. In operation, snoop signals from Snoop Control 406 allow Processors 422 to determine whether: 1.) an unmodified, requested cache line exists within Cache 348, resulting in a cache hit; 2.) a modified, requested cache line exists within Cache 348, resulting in a cache hit to a modified cache line; or 3.) no cache line exists within Cache 348, resulting in a cache miss. The snoop signals from Snoop Control 406 are used to maintain cache coherency at the system level and, therefore, provide an indication that the on-chip cache line within the snooping agent, e.g., Processor 422, is valid or invalid, whether the Cache 348 line is in a modified, or dirty, state or whether the transaction should be extended until such time that a valid snooping state may be determined.

The response phase of Bus Interface Controller 302 is controlled by Response Control Queue 410 and Response Control 408 and are responsive to requests received by In-Order Queue 404. A responding agent within the modules/interfaces 424 is responsible for processing requests at the top of In-Order Queue 404, where the responding agent is the agent being addressed by the request, e.g., Memory Port Interface 330 during a memory read of Memory 208 of FIG. 2 or alternately a memory read of Cache 348, if cached memory is present. Each response contains a response identifier, which is used to provide a response code to be placed on Bus Interface 338 during the response phase of Bus Interface Controller 302. The response code identifies, for example, a result of a bus snoop initiated by one of Processors 422. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 348 is in a modified state, then the retry or defer response code will be implicitly changed to an automatic writeback from Memory 208 of FIG. 2, where Cache 348 will provide itself as a target to maintain data coherency between Cache 348 and Memory 208.

The data phase of Bus Interface Controller 302 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from the Processor 422 to cache via the Cache Write Data Queue 415, and to the Processor as shown on path 419. Non-coherent Data Out Queue 420 operates to transfer data contained from local registers within interfaces 424 to Processors 422. A byte enable field may be used to enable multiple data bytes on the data bus per transfer cycle.

In-Order Queue 404 as illustrated in FIG. 4 represents several advantages according to the principles of the present invention. In-Order Queue 404 operates to load requests from processor 422 and holds the requests until response time. Additionally, In-Order Queue 404 provides the data necessary to execute each request to completion, which then results in a response to the request. In order to process each request to completion, however, the request must undergo various phases of execution. Through each phase of execution, data required by each phase is offered by a single queue, the In-Order Queue 404. Access to the data required by each phase of the request is facilitated through the use of various pointers to In-Order Queue 404, which is an advantage over the alternative of providing a separate buffer holding data for each phase of the request.

Figure 5:
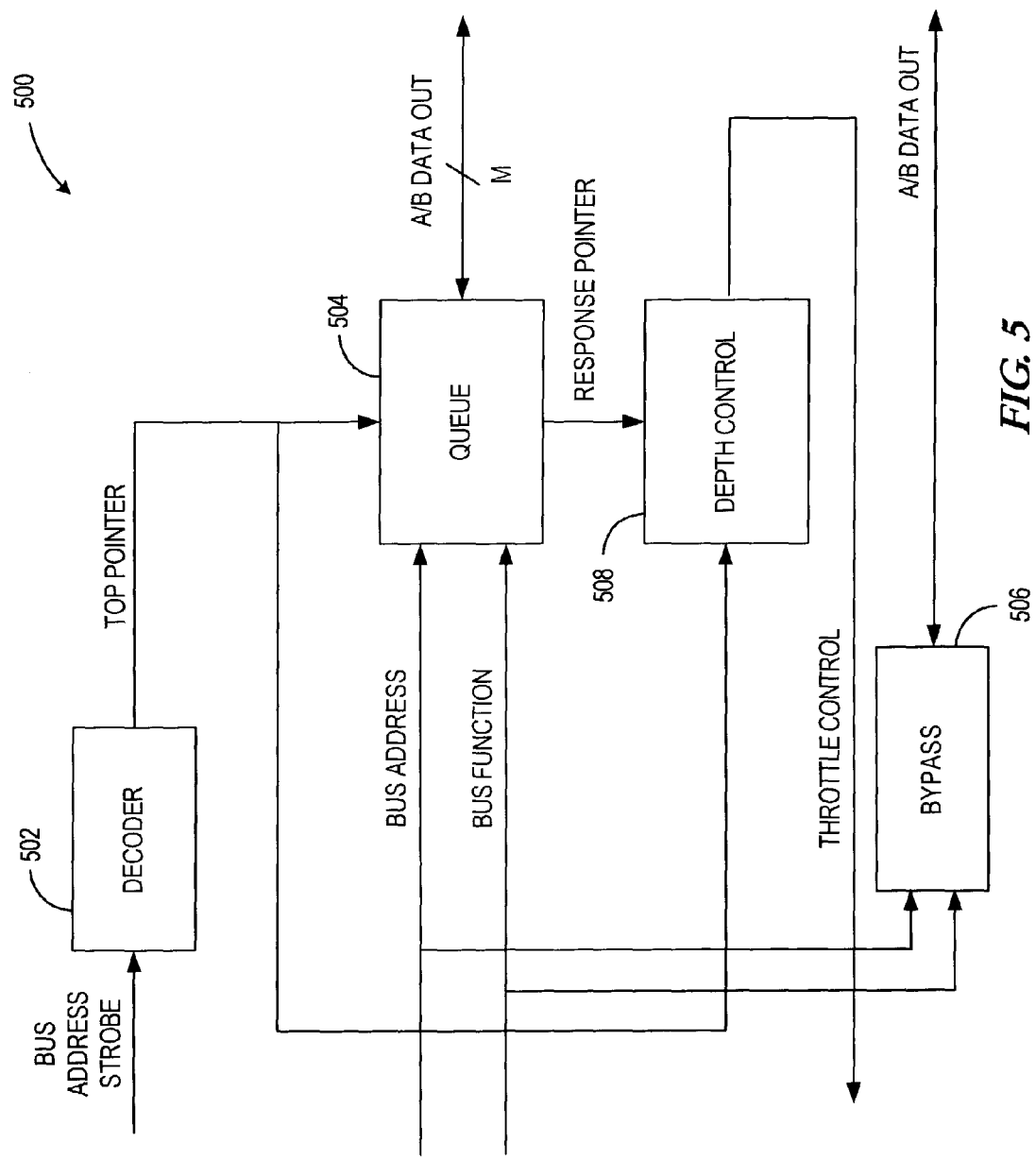
FIG. 5 illustrates an exemplary block diagram of an In-Order Queue in accordance with the present invention.

FIG. 5 illustrates an exemplary block diagram of In-Order Queue 500 according to the principles of the present invention. Bus Address and Bus Function data are received by Queue 504 from bus interface 338 as shown in FIG. 3. Decoder 502 receives Bus Address Strobe from bus interface 338 and decodes the value of Top Pointer from Bus Address Strobe. Top pointer and Response Pointer signals, generated by Decoder 502 and Queue 504, respectively, are received by Depth Control 508, where Depth Control 508 provides Throttle Control signal to bus interface 338. Queue 504 provides data, as accessed by internal pointers to Queue 504, denoted by A/B Data Out, which is a data bus of A/B signals. The value of pointers (not shown) within Queue 504, determines the data that is provided by the A/B Data Out bus. A bypass path also exists within In-Order Queue 500, which allows a bypass of Queue 504 to go directly to the A/B Data Out bus. Bypass 506, however, is only able to provide A/B Data that is valid for the current request presented on the bus.

In operation, In-Order Queue 500 receives bus requests from one of processors 202, for example, as shown in FIG. 2, where each of processors 202 maintains a copy of their own requests in an on-board, In-Order Queue of their own. Bus requests are received by Queue 504 in a two cycle process, where the first cycle is called the A cycle and the second cycle is called the B cycle. In the A cycle, the address is placed on the bus corresponding to the recipient of the request along with the desired function to be performed at the address of the request. The address, for example, may contain the address of the particular memory location that the processor is requesting to be snooped. The function, for example, may be requesting any one of a number of bus actions, such as bus read, bus write, cache line replace, etc. The B cycle supplies additional information relating to the address and function data of the A cycle.

Bus requests received by In-Order Queue 500 are strobed in by Bus Address Strobe. Decoder 502 converts the strobe signal into a pointer, Top Pointer, which indicates the next available position within Queue 504 to store the bus request. Top Pointer is, therefore, the mechanism used to queue up bus requests into Queue 504. The mechanism used to retrieve bus request data from Queue 504 is an important attribute of the present invention. Instead of transferring bus request data from Queue 504 to other registers for further processing, the bus request data is simply left in Queue 504 and subsequently accessed using a plurality of pointers (not shown). Once the actions of the bus request have been completed, a pointer is used to indicate the position within Queue 504 that was occupied by the now completed bus request. The pointer used to indicate the position of the completed bus request within Queue 504 is Response Pointer. Depth control 508 receives both Top Pointer and Response Pointer and calculates the difference between Top Pointer and Response Pointer. The difference between Top Pointer and Response Pointer indicates the number of bus requests within Queue 504 that have not been completed and is confined to be, PENDING<=N, where N is the depth of Queue 504 and PENDING is the number of bus requests to be completed as calculated by Depth Control 508.

In normal operation, the Response Pointer will always lag or equal the Top Pointer because Top Pointer increments with each received bus request and the Response Pointer only increments once the received request has been responded to. Queue 504 represents a circular buffer which provides for a buffer depth of N, where Top Pointer and Response Pointer take on address values that access entries contained within Queue 504 at locations between 1 and N. Once the value of either Top Pointer or Response Pointer has reached N, the next value of Top Pointer or Response Pointer after increment will be 1. Control logic exists within Depth Control 508 to calculate the difference between Top Pointer and Response Pointer, such that the difference between the two pointers is always less than or equal to N to ensure that Top Pointer does not circle around and overtake Response Pointer. If Top Pointer were allowed to overrun Response Pointer, then the number of unserviced bus requests skipped over by Top Pointer would remain unserviced and lost forever. Throttle Control, therefore, is driven by Depth Control 508 to alert the system bus that no further requests may be received until such time that Response Pointer has been incremented to a value either close to or equal to Top Pointer.

Figure 6:
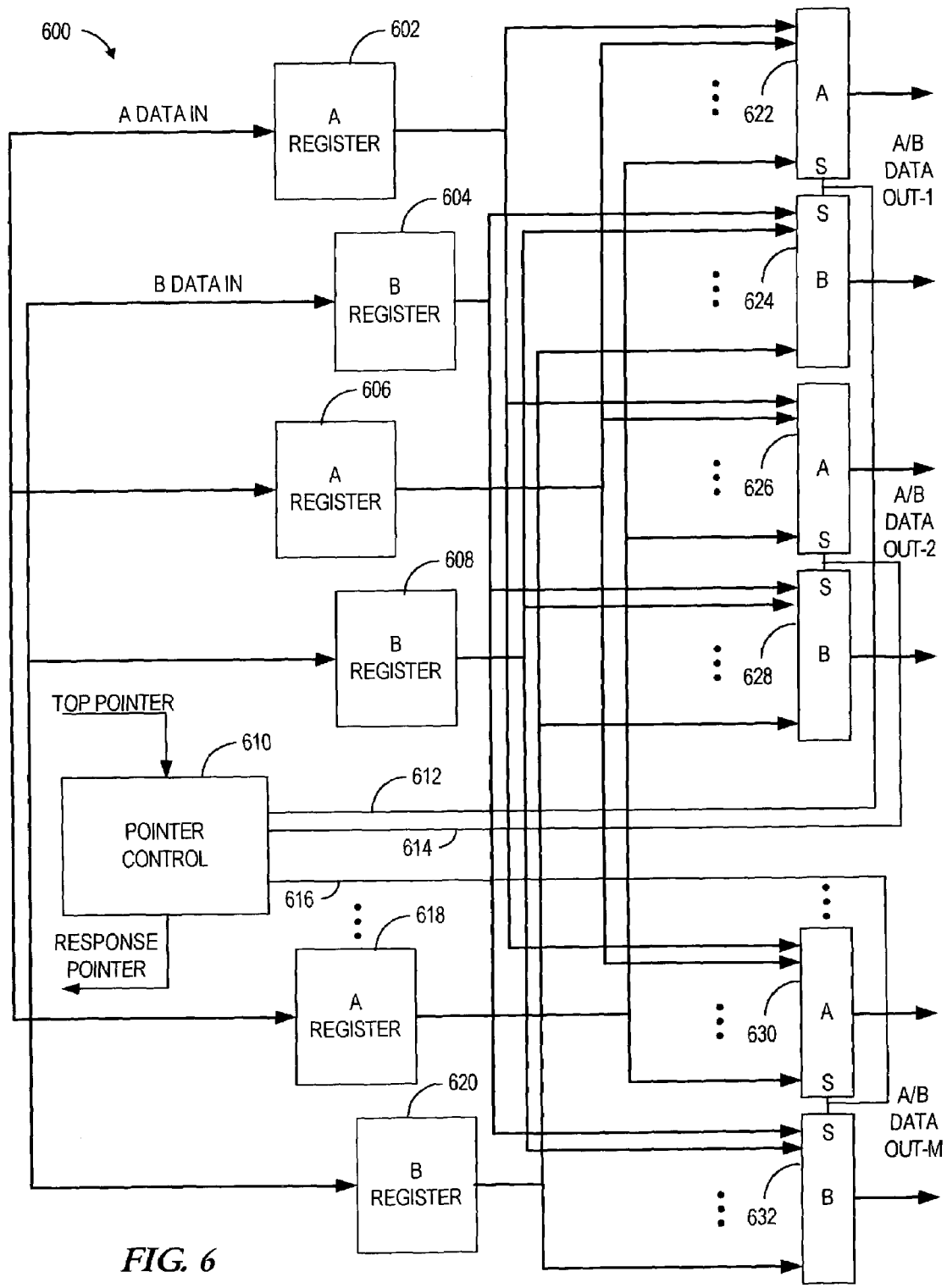
FIG. 6 illustrates an exemplary block diagram of the representative queue of FIG. 5.

FIG. 6 illustrates an exemplary detailed block diagram of Queue 504 of FIG. 5. Registers 602, 606, and 618 are configured to latch request A signals from bus interface 338 of FIG. 3 and registers 604, 608, and 620 are configured to latch request B signals from bus interface 338 of FIG. 3. Multiplexers 622, 626, and 630 receive the latched request A signals from registers 602, 606, and 618, respectively, and multiplexers 624, 628, and 632 receive the latched request B signals from registers 604, 608, and 620, respectively. It should be noted that the request A and request B latches are configured as latch pairs, where each pair represents one bus request data set within Queue 504. The number of request A and request B latch pairs, therefore, determines the depth of Queue 504. If, for example, Queue 504 had a depth of 8, then 8 A/B register pairs would exist for Queue 504 entry. 12 A/B register pairs would exist for a Queue 504 depth of 12, etc.

Multiplexer pairs 622, 624; 626, 628; and 630, 632 constitute the A/B Data Out bus as illustrated in FIG. 5. Pointer Control 610 provides the select signals required by multiplexer pairs 622, 624; 626, 628; and 630, 632 to determine which of N input signals are to be activated at the output of multiplexer pairs 622, 624; 626, 628; and 630, 632. Thus, the number of input lines to multiplexer pairs 622, 624; 626, 628; and 630, 632 is also equal to the depth N of Queue 504 of FIG. 5. Additionally, the number of select lines driven by Pointer Control 610 is also equal to the depth N of Queue 504. Pointer Control 610 receives Top Pointer from Decoder 502 of FIG. 5 to determine which one of N inputs to the A/B multiplexer pair are responsible for providing current request data on the A/B Data Out bus. Additionally, Pointer Control 610 provides the Response Pointer value to Depth Control 508 of FIG. 5, so that Depth Control 508 is able to calculate the current number of queued requests existing within Queue 504 waiting to be executed.

The actual data provided by each multiplexer pair depends upon 1.) the data latched by its corresponding A/B register pair; and 2.) the value of the select line as provided by Pointer Control 610. The data latched by each A/B register pair 602, 604; 606, 608; and 618, 620 represents each request A and request B that is presented on bus interface 338 of FIG. 3 in sequence. Pointer Control 610 determines which A/B register pair's data is to be provided at which A/B multiplexer pair's output. That is to say, that since a data bus interconnects each of A/B register pairs 602,604; 606, 608; and 618, 620 to each of multiplexer pairs 622, 624; 626, 628; and 630, 632, any combination of register/multiplexer pair may be selected to ultimately provide A/B Data Out-1 through A/B Data Out-M, where M is the number of multiplexers provided by Queue 600. For example, the data latched by A/B register pair 602, 604 may be selected by multiplexer pair 630, 632 such that A/B Data Out-M is equal to the data latched by A/B register pair 602, 604. Pointer Control 610, for this example, would provide a select input to multiplexer pair 630, 632 such that the $1^{st}$ input to multiplexer pair 630, 632 is selected, i.e., the data latched by A/B register pair 602, 604. It can be seen, therefore, that the number of possible register/multiplexer combinations is proportional to the depth N of A/B registers within Queue 504 and to the depth M of A/B multiplexers within Queue 504.

In operation, Queue 600 operates to instantaneously provide data on the A/B Data Out bus that corresponds to a given phase of Bus Interface Controller 302 of FIG. 3. Assuming that a processor has already arbitrated for control of bus interface 338 of FIG. 3, the next phase of operation is the request phase. One of processors 202 of FIG. 2 applies valid address and function data to bus interface 338 and then applies the Bus Address Strobe corresponding to that particular processor. The Bus Address Strobe is decoded by Decoder 502 to determine the value of Top Pointer, which in turn is used by Pointer Control to determine which of A/B multiplexer pairs 622, 624; 626, 628; and 630, 632 will provide the address and function data as provided by the processor for the current request. Additionally, a determination is made based on the value of Top Pointer as to which of A/B register pairs 602,604; 606, 608; and 618, 620 are used to latch the address and function data for the current request. Any number of functions may be requested by processor 202, examples of which include, I/O Read, I/O write, Bus Read Invalidate, Bus Read, Bus Write, Bus Write (Snoop), Bus Read Current, Cache Line Replace (No Snoop), and Cache Line Replace (Snoop), to name only a few.

Once the request A and request B information has been latched into Queue 600, the data is to be provided to Transaction Pipeline 314 of FIG. 3. Instead of transferring the request A and request B data to Transaction Pipeline 314, the pointer associated with the pipelined request, e.g., snoop request, is set by Pointer Control 610, such that Transaction Pipeline 314 of FIG. 3 has substantially instantaneous access to the request A and request B data needed to perform the snoop request. For example, if Transaction Pipeline 314 of FIG. 3 accessed data presented by A/B multiplexer pair 626, 628, then select line 614 of multiplexer pair 626, 628 would be set by Pointer Control 610 to equal the snoop request pointer so that Transaction Pipeline 314 of FIG. 3 may access the required data to perform the requested snoop request.

A/B multiplexer pair 626, 628 is used, in this example, to provide the data latched by A/B register pairs 606, 608 to perform the snoop request. The data includes a snoop address field containing the memory address location to be snooped, the snoop function to be performed as discussed above and any required system information needed for the snoop request. The data is then used by Transaction Pipeline 314 to perform a tag lookup function into Tag RAM 316 of FIG. 3 to determine whether or not a tag exists within Tag RAM 316 of FIG. 3 that corresponds to the particular snoop address requested by processor 202 of FIG. 2.

Transaction Pipeline 314 of FIG. 3, after getting the results of the Tag lookup, provides the results in the snoop result phase of bus interface controller 302 of FIG. 3. The snoop result, or tag state, delivered by Transaction Pipeline 314 of FIG. 3 depends upon whether or not a tag, corresponding to the snoop address, exists within Tag RAM 316 of FIG. 3. The snoop result may return a tag hit, which means that a copy of the data for the particular snoop request is currently cached, or owned, by Node Controller 300 of FIG. 3. The snoop result may also return a tag miss, indicating that the tag associated with the requested snoop address is not present with Tag RAM 316 of FIG. 3.

In order to place the snoop results onto bus interface 338 of FIG. 3, however, additional data is required by Bus Interface Controller 302 of FIG. 3 in order to formulate the entire snoop result to be placed onto the bus. The additional information needed by Bus Interface Controller 302 is selected from Queue 600 according to the value of a tag pointer. The tag pointer is calculated by Pointer Control 610 such that the select line of the A/B multiplexer pair associated with the tag data of interest may be accessed. For example, if multiplexer pair 630, 632 were associated with tag data, then Pointer Control 610 would apply the value of the tag pointer to select line 616, thus presenting the necessary tag data to Bus Interface Controller 302 of FIG. 3 required to calculate the entire snoop result.

Once snoop results have been placed on system interface 338 by Bus Interface Controller 302, snoop results from all other processors 202 of FIG. 2 will have been placed on the bus as well. The snoop results from processors 202 of FIG. 2 are to be taken at the valid snoop time and then transferred to Transaction Pipeline 314 of FIG. 3. Additional information is needed, however, in order to complete the snoop result transfer to Transaction Pipeline 314 of FIG. 3. The additional information needed for the snoop transfer is provided by Queue 600 according to the value of a snoop pointer. The snoop pointer being set by Pointer Control 610 to set the value of the select line of the A/B multiplexer pair used to provide data that is required to facilitate the snoop result transfer to Transaction Pipeline 314 of FIG. 3.

Once the snoop results have been transferred to Transaction Pipeline 314 of FIG. 3, Bus Interface Controller 302 of FIG. 3 enters into the response phase of the bus. Once again, information is needed to complete the response phase on bus interface 338 of FIG. 3 and that information is obtained from Queue 600 according to the value of a response pointer as calculated by Pointer Control 610 and associated A/B multiplexer pair for the response phase.

Figure 7:
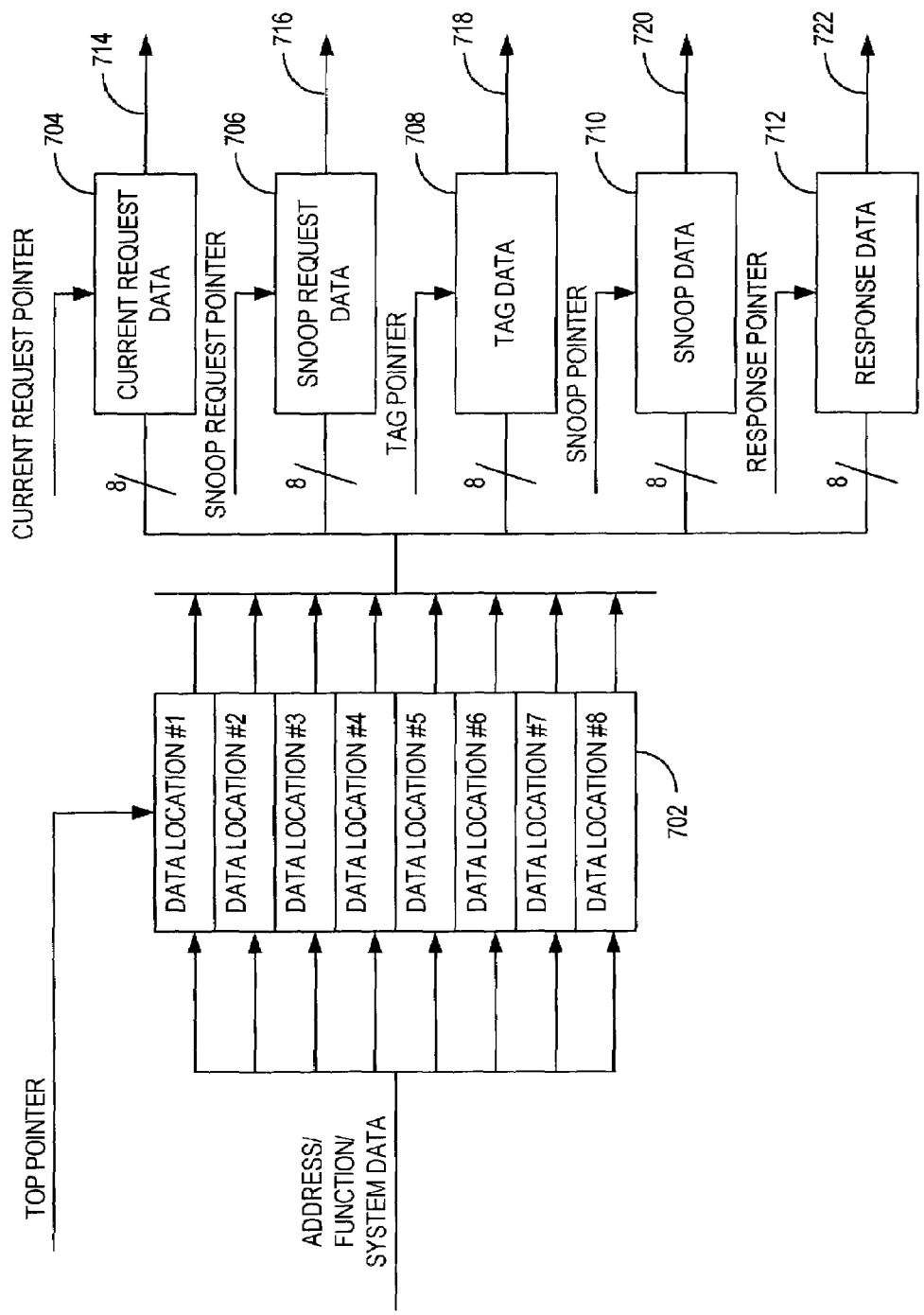
FIG. 7 illustrates a functional block diagram of the representative In-Order Queue of FIG. 5.

FIG. 7 illustrates a functional diagram of In-Order Queue 500 as illustrated in FIG. 5. Queue 702 represents, for example, an 8 deep input queue capable of storing up to 8 sets of request A and request B information without risk of overlap. Data Locations 1-8 are selectable through the value of Top Pointer, which indicates to which data location request A and request B information is to be stored. At startup, for example, the value of Top Pointer may indicate that Data Location #1 is to latch the request A and request B information from bus interface 338 of FIG. 3. Once latched, Top Pointer will be incremented such that Data Location #2 is the next location to receive request A and request B information.

Current Request Data 704 represents a multiplexer bank that provides request A and request B address and function data according to the value of Current Request Pointer. If, for example, the last request was received into Data Location #3, then the value of Current Request Pointer would be equal to 3, such that the third input into Current Request Data Mux 704 is selected at output 714.

Snoop Request Data 706 represents a multiplexer bank that provides request A and request B address and function data according to the value of Snoop Request Pointer. If, for example, the snoop request was operating with data associated with Data Location #7, then the value of Snoop Request Pointer would be equal to 7, such that the seventh input into Snoop Request Data Mux 706 is selected at output 716.

Tag Data 708 represents a multiplexer bank that provides request A and request B address and function data according to the value of Tag Pointer. If, for example, snoop results from the snoop request associated with Data Location #7 were needed on bus interface 338 of FIG. 3, then the value of Tag Pointer would be equal to 7, such that the seventh input into Tag Data Mux 708 is selected at output 718.

Snoop Data 710 represents a multiplexer bank that provides request A and request B address and function data according to the value of Snoop Pointer. If, for example, snoop results, relating to the snoop request above, from processors 202 of FIG. 2 were needed to be transferred from bus interface 338 of FIG. 3 to Transaction Pipeline 314 of FIG. 3, then the value of Snoop Pointer would be equal to 7, such that the seventh input into Snoop Data Mux 710 is selected at output 720.

Response Data 712 represents a multiplexer bank that provides request A and request B address and function data according to the value of Response Pointer. Once the response phase of Bus Interface Controller 302 has been entered, information needed to complete the response on bus interface 338 is presented by Response Data Mux 712. If, for example, the response to the snoop request A and request B data stored in Data Location #7 is required, then the value of Response Pointer would be equal to 7, such that the seventh input to Response Data Mux 712 is selected at output 722.

It can be seen, therefore, that single entry Data Locations 1-8 of Queue 702 may be accessed by any combination of Current Request, Snoop Request, Tag, Snoop, or Response pointers. That is to say that Queue 702 provides shared access to any data location in accordance with the value of the pointers. Any one or all of the pointers may be pointing to the same location at the same time, thus allowing any one of Data Locations 1-8 of Queue 702 to be simultaneously shared by any of the Snoop Request, Tag, Snoop or Response transactions as discussed above.

In conclusion, a method and apparatus has been presented that precludes the requirement of transferring data to various registers depending upon the particular phase that a Bus Interface Controller may be operating in. Rather, a plurality of phase dependent pointers are maintained that allows access to a single bank of registers, which simultaneously provides address, function, and system data to bus transactions operating in parallel to one another. Accordingly, system performance is enhanced through the reduction of access time required to retrieve the address, function, and system data.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A multiple entry queue system for a multiprocessor system, comprising:
    a storage unit having a plurality of storage locations;
    a plurality of multiplexers, each multiplexer having inputs coupled to each of the plurality of storage locations, and each multiplexer corresponding to a respective one of a plurality of pointers including a response pointer, and each pointer corresponding to one of a plurality of different phases of processing a bus request in the storage unit and each pointer being adjustable to reference one of the storage locations having a bus request in one of the phases, wherein the plurality of phases includes a snoop phase;
    a controller coupled to the storage unit and coupled to each of the plurality of multiplexers to allow simultaneous access to the plurality of storage locations, wherein the controller provides a first pointer that indicates a next available one of the plurality of storage locations, advances a response pointer of the plurality of pointers that indicates a storage location having a bus request that was completed in response to completion of the bus request, in response to receipt of a new bus request stores the new bus request in the storage location referenced by the first pointer and advances the first pointer, controls access to the plurality of storage locations as a circular FIFO and prevents the first pointer from advancing past the response pointer, and generates respective selection signals corresponding to the plurality of pointers, wherein each selection signal is coupled to a selection input of a respective one of the plurality of multiplexers;
    wherein for each of the plurality of pointers other than the response pointer, a request in a storage location selected by the corresponding selection signal remains for subsequent reading and the storage location is unavailable for a new request; and
    wherein the plurality of pointers does not include the first pointer, and selection signals from the plurality of pointers provide simultaneous read access to data in storage locations bounded by the first pointer and the response pointer.

2. The multiple entry queue system according to claim 1, further comprising a system bus of a multiprocessor system coupled to the plurality of banks of multiplexers to propagate the requests that include bus address and function data.

3. The multiple entry queue system according to claim 2, wherein the controller selects contents of one of the plurality of storage locations to present at an output of the banks of multiplexers.

4. The multiple entry queue system according to claim 1, wherein the controller maintains a value of a first pointer indicative of a current bus request.

5. The queue system of claim 1, wherein the plurality of phases include a snoop result phase.

6. The queue system of claim 5, wherein the plurality of phases include a current request phase.

7. A method of providing multiple access to a single entry in a bus request queue, comprising:
    receiving bus transaction requests into respective single entries of the bus request queue;
    maintaining a first pointer that references the bus request queue, wherein the bus transaction request is received into sequential positions of the bus request queue indicated by the first pointer, and advancing the first pointer to a successive next entry of the bus request queue in response to receiving a bus transaction request;

maintaining a response pointer that indicates a queue entry having a completed bus transaction request, and advancing the response pointer to a successive next entry of the bus request queue in response to completion of a bus transaction request;

maintaining a plurality of separate pointers to the bus request queue, wherein the plurality of separate pointers does not include the first pointer and each of the plurality of pointers corresponding to one of a plurality of different phases of processing a bus request in the request queue and each pointer being adjustable to reference entries in the bus request queue bounded by the first and response pointers, wherein the plurality of phases includes a snoop phase;

wherein one of the plurality of pointers references a current bus request, one of the plurality of pointers references a cache snoop request, one of the plurality of pointers references, and one of the plurality of pointers references cache snoop data in the bus request queue;

providing simultaneous access to the bus transaction requests in the bus request queue via the respective plurality of separate pointers, wherein for each of the plurality of separate pointers, a bus transaction request in a queue entry referenced by the corresponding pointer remains for subsequent access and the queue entry is unavailable for a new bus transaction request.

8. The method according to claim 7, further comprising preventing the separate pointers from advancing past the first pointer.

9. The method according to claim 8, wherein preventing the separate pointers from advancing past the first pointer includes preventing the receipt of request data into the bus request queue.

10. A multiprocessing system, comprising:

a plurality of multiprocessors sharing a common system bus with access to a common memory pool;

a node controller coupled to each of the plurality of multiprocessors, the node controller including, a storage unit having a plurality of storage locations to store bus requests from the plurality of multiprocessors;

a plurality of multiplexers, each multiplexer having inputs coupled to each of the plurality of storage locations, and each multiplexer corresponding to a respective one of a plurality of pointers, and each pointer corresponding to one of a plurality of different phases of processing a bus request in the storage unit and each pointer being adjustable to reference one of the storage locations having a bus request in one of the phases, wherein the plurality of phases includes a snoop phase; and a controller coupled to the storage unit and coupled to each of the plurality of multiplexers, wherein the controller maintains a first pointer that indicates a next available one of the storage locations, in response to receipt of a new request stores the new request in the storage location referenced by the first pointer and advances the first pointer, advances a response pointer that indicates a storage location having a request that was completed in response to completion of the request, controls access to the plurality of storage locations as a circular FIFO and prevents the first pointer from advancing past the response pointer, and generates respective selection signals corresponding to the response pointer and plurality of pointers, wherein each selection signal is coupled to a selection input of a respective one of the plurality of multiplexers;

wherein for each of the plurality of pointers other than the response pointer, a request in a storage location selected by the corresponding selection signal remains for subsequent reading and the storage location is unavailable for a new request; and wherein the plurality of pointers does not include the first response pointer, and selection signals from the plurality of pointers provide simultaneous read access to data in storage locations bounded by the first pointer and the response pointer.

11. The multiprocessing system of claim 10, wherein the storage unit is coupled to receive the bus address and function data.

12. The system of claim 10, wherein the plurality of phases include a snoop result phase.

13. The system of claim 12, wherein the plurality of phases include a current request phase.

\* \* \* \* \*